United States Patent Office 3,109,860
Patented Nov. 5, 1963

3,109,860
PROCESS FOR RECOVERY OF CYCLOHEXANONE AND CYCLOHEXANOL
Rex E. Lidov, Great Neck, and William L. Riedeman, Bronxville, N.Y., assignors to Halcon International, Inc., a corporation of Delaware
No Drawing. Filed Dec. 14, 1959, Ser. No. 859,109
5 Claims. (Cl. 260—586)

This invention relates to an improved process for recovering cyclohexanone and cyclohexanol values from a wash solution.

Cyclohexanol and cyclohexanone have been generally produced by partially oxidizing cyclohexane, and then in a second operation separating the unreacted cyclohexane from the resulting mixture, hereinafter called oil, which contains cyclohexanol and cyclohexanone. A convenient method of separating the cyclohexanol and cyclohexanone constituents in the oil from its impurities, as disclosed in a copending application of Rex E. Lidov et al., Ser. No. 859,110, filed concurrently herewith, comprises separating the bottoms in a distillation step and mixing the resulting fraction with an aqueous caustic or alkaline solution, such as dilute sodium hydroxide, to form an oil phase containing cyclohexanol and cyclohexanone and an aqueous phase containing organic salts and other undesirable impurities in addition to significant quantities of dissolved cyclohexanone and cyclohexanol. The oil phase may be suitably removed by decantation, while the impurities remain behind in the caustic wash solution. This aqueous caustic wash solution may then be reused to purify additional amounts of oil in similar fashion. Eventually, however, the caustic wash solution becomes spent and must be replaced with fresh caustic solution. In the present status of the art the spent caustic carries with it some dissolved cyclohexanol and cyclohexanone which is unrecoverable if the spent caustic is discarded. It is principally this objection which has created a need for minimizing the loss of cyclohexanol and cyclohexanone in spent caustic wash solutions.

It is, therefore, an important object of the present invention to provide an improved method of reducing the concentration of cyclohexanone and cyclohexanol in the aqueous caustic wash solution used in washing a mixture of cyclohexanone and cyclohexanol of its contained impurities.

Another object of the present invention is to provide, in the washing of an impure mixture of cyclohexanol and cyclohexanone, an improved method for washing the impure mixture of its contained impurities and at the same time reducing the concentration of dissolved cyclohexanol and cyclohexanone in the washing solution Yet another object of the present invention is to provide in the washing of an impure mixture of cyclohexanol and cyclohexanone an improved process for selectively washing the impure mixture of its contained impurities and simultaneously minimizing the concentration of dissolved cyclohexanone and cyclohexanol in the washing solution.

Other objects, features and advantages of the present invention will be apparent to those skilled in the art from the following detailed description of a preferred embodiment thereof.

In accordance with the invention it has been found that the separation of cyclohexanone and cyclohexanol from an aqueous alkaline wash solution such as for example, sodium hydroxide, may be more efficiently effected by incorporating in the alkaline wash solution an inorganic salt, such as sodium sulfate, which will substantially lower the cyclohexanol and cyclohexanone contents in the alkaline wash solution. Yet the sodium sulfate does not react with cyclohexanone or cyclohexanol and has no noticeable effect on the scrubbing action of the alkaline solution in removing impurities of the cyclohexanone-cyclohexanol containing mixture. A particularly unusual feature of the wash solution of the invention is that it selectively absorbs the impurities in the mixture, and at the same time substantially excludes cyclohexanone and cyclohexanol, with the result that the purity of the cyclohexanone-cyclohexanol containing mixture is considerably enhanced. As a consequence impure cyclohexanol-cyclohexanone mixtures washed with the aqueous alkaline solution containing sodium sulfate will have a higher recovery of cyclohexanone and cyclohexanol values and higher product purity than similar mixtures washed by other known means.

The concentration of the aqueous alkaline wash solution should range from about 2 wt. percent to 20 wt. percent, desirably from about 5 wt. percent to 15 wt. percent, and preferably about 10 wt. percent.

In most cases, the concentration of $Na_2SO_4$ should be preferably at or near saturation concentration, although smaller amounts may be used, if so desired.

Optimum recovery of cyclohexanone and cyclohexanol is achieved when the components of the alkaline wash solution are in approximately the following proportions:

| | Wt. percent |
|---|---|
| NaOH | 10 |
| $Na_2SO_4$ | 33 |

In order to indicate still more fully the nature of the present invention the following examples of typical procedures are set forth, it being understood that these examples are presented as illustrative only and they are not intended to limit the scope of the invention.

*Example 1*

Cyclohexane is charged into a pot, heated and reacted with air, and distilled to obtain a cut boiling in the range from cyclohexanone through cyclohexanol. The cut is vigorously agitated in a flask for 5 minutes at 25° C. with an alkali-water phase. The charge to the flask consists of 15 lbs. water phase to 33 lbs. of oil cut. The water phase contains 10% sodium hydroxide and 15% $Na_2SO_4 \cdot 10H_2O$. The mixture is then allowed to separate into an aqueous and an oil phase. After separation of the two phases, the oil phase is distilled in a 20-plate Oldershaw column at a 5:1 reflux ratio. The combined cyclohexanone cut has a 97% purity.

*Example 2*

Example 1 is repeated, substituting for the water phase a 10% aqueous sodium hydroxide solution. The combined cyclohexanone cut shows a purity of 93%.

While in the foregoing examples, the sodium sulfate is incorporated in the sodium hydroxide wash solution fed to the oil, it is to be noted that the sodium sulfate can be added at any stage during the washing or if only enhanced recovery is sought, during decantation of the oil, or even subsequent to the decantation of the oil but before discarding the spent wash solution.

Although the invention has been described in terms of a sodium sulfate addition to a dilute aqueous sodium hydroxide wash solution, it is to be understood that the sodium sulfate is susceptible of use in connection with other aqueous alkaline solutions, such as potassium hydroxide, and that other moderately and highly soluble inorganic neutral salts may be used instead of sodium sulfate It will be understood that modifications and variations may be effected without departing from the spirit and scope of the invention.

What is claimed is:
1. A process for recovering cyclohexanone and cyclo- hexanol from a mixture of cyclohexanone and cyclohexanol together with impurities formed during cyclohexane oxidation, comprising admixing a dilute aqueous alkali metal hydroxide wash solution containing sodium sulphate in amount sufficient to substantially lower the cyclohexanol and cyclohexanone contents in the wash solution with said mixture, forming an oil phase comprising cyclohexanone and cyclohexanol and an aqueous phase in which said impurities are selectively absorbed, and removing said oil phase from said aqueous phase.

2. A process for recovering cyclohexanone and cyclohexanol from a mixture of cyclohexanone and cyclohexanol with impurities formed during cyclohexane oxidation, comprising admixing a dilute aqueous alkali metal hydroxide wash solution with said mixture to form an oil phase containing cyclohexanone and cyclohexanol, decanting said oil phase, incorporating sodium sulphate in the remaining aqueous phase in amount sufficient to substantially lower the cyclohexanol and cyclohexanone contents in the wash solution prior to discarding same to recover additional amounts of cyclohexanone and cyclohexanol.

3. A process for refining a mixture of cyclohexanone and cyclohexonol together with impurities formed during cyclohexane oxidation comprising washing the mixture with a dilute aqueous sodium hydroxide solution containing sodium sulphate in amount sufficient to substantially lower the cyclohexanol and cyclohexanone contents in the wash solution to form an oil phase containing cyclohexanone and cyclohexanol and an aqueous phase containing the impurities and including dissolved cyclohexanone and cyclohexanol, decanting said oil phase, discarding a portion of said aqueous phase as spent liquid, recycling the remaining portion of said aqueous phase to similarly produce an oil phase and additional amounts of impure cyclohexanol and cyclohexanone containing mixture, and adding to said remaining portion of said aqueous phase fresh dilute aqueous sodium hydroxide solution containing sodium sulphate as make up.

4. The process according to claim 1 wherein said alkali metal hydroxide is sodium hydroxide.

5. The process according to claim 1 wherein said alkali metal hydroxide is potassium hydroxide.

References Cited in the file of this patent

UNITED STATES PATENTS

| | | |
|---|---|---|
| 2,552,670 | Fleming | May 15, 1951 |
| 2,931,834 | Crouch et al. | Apr. 5, 1960 |